No. 871,169.
PATENTED NOV. 19, 1907.
F. C. HOOD.
PNEUMATIC TIRE.
APPLICATION FILED JUNE 11, 1906.
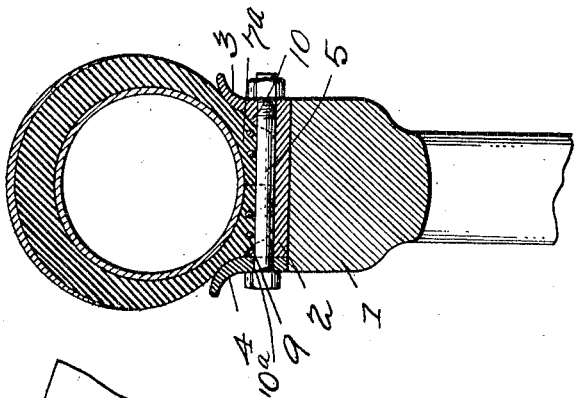
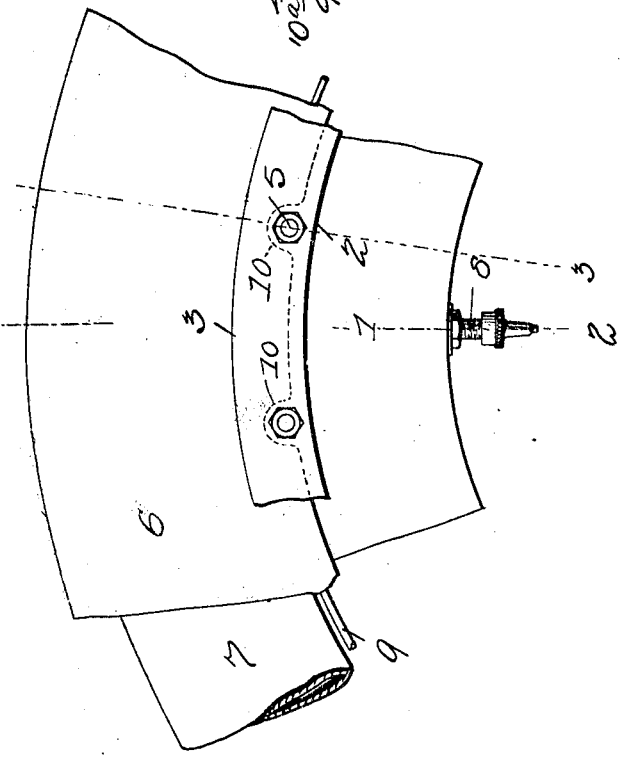
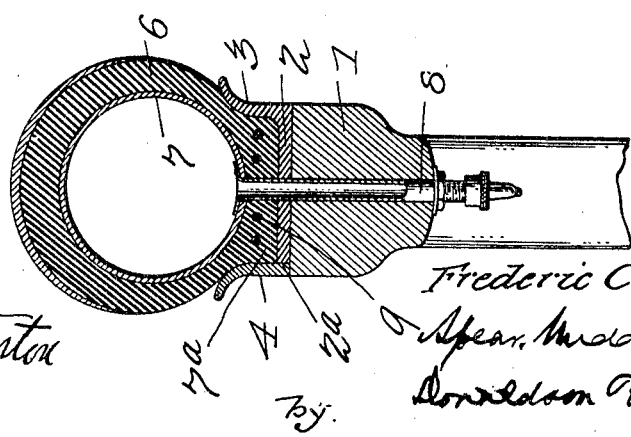
Inventor
Frederic C. Hood

UNITED STATES PATENT OFFICE.

FREDERIC CLARKE HOOD, OF BOSTON, MASSACHUSETTS.

PNEUMATIC TIRE.

No. 871,169.

Specification of Letters Patent.

Patented Nov. 19, 1907.

Application filed June 11, 1906. Serial No. 321,229.

*To all whom it may concern:*

Be it known that I, FREDERIC CLARKE HOOD, a citizen of the United States, residing at Boston, Massachusetts, have invented certain new and useful Improvements in Pneumatic Tires, of which the following is a specification.

My invention relates to improvements in pneumatic tires, and more especially to detachable or mechanically fastened tires for motor vehicles.

In devising my said invention I have aimed to provide a construction which will permit of the outer case being easily and quickly applied and removed while all danger of accidental displacement under great stress as in rounding curves is avoided, and all possibility of the tire coming off in case of accidental deflation is prevented.

I have also aimed to so shape or construct the parts that it will be practically impossible to apply the tire to the wheel with the inner tube "pinched" as so frequently happens with ordinary forms of double tube tires.

A still further object is to provide a construction in which rim cutting is avoided and all danger of creeping removed.

With these and possibly other objects in view, the invention includes the special features of construction and arrangement and combination of parts hereinafter described and particularly set forth in the appended claims.

It is illustrated in the accompanying drawing, in which,—

Figure 1 is a side elevation of a portion of a wheel rim with the tire applied thereto. Fig. 2 is a transverse section on line 2—2 of Fig. 1 and, Fig. 3 is a similar section on line 3—3 of Fig. 1.

Referring by reference characters to this drawing, the numeral 1 designates the wooden felly of a vehicle wheel of the ordinary or any desired construction, and 2 a metal rim secured to the felly in any convenient and well known manner. This rim may advantageously be made of pressed steel, and it has one edge (the inner) provided with an integral flange 3 which is rounded or curved outwardly as shown. The rim upon the other side is provided with a removable flange 4 of similar shape which abuts against the edge 2ª of the rim and is held in place by bolts 5 which pass through alining holes in the removable and integral flanges. The holes in the flanges are so located, as will be readily seen from the drawing, that the bolts rest against the outer face of the rim, this arrangement having a two-fold function, one being to provide means for preventing the tire from creeping upon the rim in the manner hereinafter described, and the other being that this arrangement renders it necessary to only provide holes through the flanges 3 and 4, and the forming of holes or channels in the body of the rim itself is unnecessary, thereby reducing the amount of work and cheapening the construction.

The outer case is shown at 6 and the inner tube at 7, this latter being provided with the usual valve tube or stem 8. The outer case is provided with thickened edges 7ª in which I preferably locate a plurality of endless wires 9 which are molded and vulcanized in the rubber and serve to prevent stretching. The outer case is formed so that its inner circumference corresponds to the outer periphery of the rim 2 and the edges 7ª are so shaped in cross section that when they are in place upon the rim and confined by the side flanges 3 and 4 a complete cylindrical channel is formed within the outer case for the reception of the inner tube and no channels or recesses are left into which the inner tube may be expanded or pinched by the air pressure within the same.

The edges 7ª of the outer case are formed in molding with transverse grooves or channels in the under-face corresponding in size and position to the bolts 5, and the engagement of the bolts with these grooves serves to prevent any creeping of the tire upon the rim.

I find it desirable to provide lugs or projections 10 and 10ª on the rim on opposite sides at the points where the bolt holes are located, the projections 10 being integral with the flange 3 and serving to brace it while the projections 10ª serve as an abutment against which the removable flange 4 is clamped by the bolts. These lugs or projections also strengthen the rim by providing a greater amount of metal at the points where the bolts pass through. The corners of the outer case are provided with recesses to correspond with these lugs and the increased engaging surface serves as a further preventive against creeping.

When the tire thus constructed is to be removed from the rim the removable flange 4 is detached when the portion of the outer case on the side of the wheel opposite the rim may be slipped off laterally, the tire of course having first been deflated. This will permit the valve stem to be drawn out of the opening in the rim and felly, when of course the inner tube may be readily moved from the outer case or the whole tire removed. In replacing the tire upon the wheel, it will be readily understood that the reverse operation will take place.

From the foregoing construction, it will be obvious that I provide a tire which will be firmly held upon the rim, and which cannot creep thereon, and one in which liability of rim cutting is reduced to a minimum. I also provide a tire which may be quickly and easily removed and replaced, and one in which the inner tube may be properly placed in position within the outer case before any part of the outer case is placed upon the rim, which is a very important feature.

Having thus described my invention, what I claim is:—

In combination, a rim having a substantially flat surface and a permanent retaining flange on one side, a removable flange on the opposite side, inwardly extending projections having inclined faces at the junctions of the flanges and rim, said projections serving to brace said flanges, bolts passing across the face of the rim and through said projections and connecting the permanent and removable flanges, and a resilient tire seated on said rim and confined between said flanges, said tire having transverse grooves to receive the bolts and corner recesses to receive the lugs, substantially as described.

In testimony whereof I affix my signature in presence of two witnesses.

FREDERIC CLARKE HOOD.

Witnesses:
   M. CUTTING,
   EVA LEAVITT.